Patented Oct. 20, 1942

2,299,509

UNITED STATES PATENT OFFICE 2,299,509

PLASTIC PRODUCT

Chester Snyder, Yonkers, N. Y., assignor to Liatex Corporation, New York, N. Y., a corporation of New York No Drawing. Application September 23, 1939, Serial No. 296,225

8 Claims. (Cl. 260—27)

This invention relates to the production of plastic materials that are flexible and resilient. These flexible and resilient plastics are insoluble in solvents such as water, alcohol, acetone, turpentine ether, benzol and hydrocarbons, and are acid and alkali resistant.

In carrying out this invention a gum obtained from South America, known as No. 4 gum, which is to be described below, is thoroughly mixed or compounded with other materials in such a way that synthetic products result which are useful for many purposes such as tile, flooring, belting and coatings or coverings to protect all sorts of surfaces from solvents, acids, alkalis and other injurious substances, including fungi.

No. 4 gum is sold under the trade-mark "Massarandura" and its local and commercial name is the same. It is obtained from the Brazilian cow-tree. *Mimusops eleta* or *Mimusops amazonica* Hub, otherwise known as *Couna utilisan apocynacae*. The genus is Mimusops, and the family is Sapotaceae. It is a heavy dark hard product that is insoluble in the usual solvents and is acid and alkali resistant and will not melt but can be softened by heat sufficiently to be formed into shapes.

The following are given as illustrative examples of carrying out the invention.

Example 1

No. 4 gum is mixed at an elevated temperature with the sulphur dichlorhydrin plastic described in U. S. Patent 2,026,875, preferably that described in Examples 7, 8 and 9 thereof. The amount of the gum may be from about 1% to about 99% of the mixture by weight. The mixing or grinding together can be established, for example, in the well known Banbury mixer at temperatures from about 150° F. to about 300° F. in a few minutes, usually about 15 minutes. When about 5% or more of the mixture is the dichlorhydrin, a flexible resilient product results. When 25% or more of the mixture is the gum, the product is acid resistant and also insoluble in the solvents mentioned above, and at the same time it is resistant to strong acids and alkalis.

The coloring matter or dyes in the No. 4 gum can be removed by finely disintegrating it and boiling it a long time with sodium hydroxide. When so treated and 25% or more is used with the dichlorhydrin, the resulting plastic becomes more resistant to strong acids and still remains flexible and elastic.

Example 2

No. 4 gum is compounded in a way similar to that in Example 1 with the products sold on the market as "Thiokol," such as the reaction products of alkaline polysulphides and olefine compounds containing the group $C_nH_{2n}$ combined with a negative radical, as set forth, for example, in U. S. Patent 1,890,191. The proportions vary from about one-twentieth as much of the gum as of the "Thiokol" to about twenty times as much of the gum as of the "Thiokol." The resulting products are flexible, they are insoluble in the usual solvents, and are acid and alkali resistant.

Example 3

Yellow Austrian ozokerite is compounded with the proportions of the No. 4 gum and "Thiokol" set forth in Example 2 and mixed in the same way. The amount of the ozokerite in the mixture varies from about 1% to about 5% of the "Thiokol" that is used. It is preferable to mix or grind the "Thiokol" and ozokerite together first at the elevated temperature, and then add the gum and mix at the elevated temperature.

Example 4

The No. 4 gum "Thiokol" and sulphur dichlorhydrin are compounded together in the same way. The dichlorhydrin and "Thiokol" react chemically, and the plastics formed by this example possess the characteristics of flexibility and elasticity, insolubility, and resistance to strong acids and alkalis. The dichlorhydrin and "Thiokol" vary from about one-twentieth to twenty times as much of one as the other, and the gum varies from about 0.5% to about 50% of the total.

These flexible, elastic products can be made to adhere to surfaces by heating them until they become soft and sticky and by then pressing them against the surfaces. Rendering them soft and sticky by heat does not injure them. They can, however, be rolled into thick or thin sheets between smooth hot steel rollers while they are softened by heat, and they do not stick to the rollers or gum them up.

Example 5

The No. 4 gum, the gum known on the market as "Pontianak" gum obtained from the Dyera tree and sometimes called Jelutong rubber, and sulphur dichlorhydrin are compounded together in the same way. The Pontianak gum may vary from about 0.5% of the mixture to about 25% thereof with the proportions of the No. 4 gum ranging from about one-fourth to about one-twenty-fifth of the dichlorhydrin. The composition of 2% Pontianak gum, 4% No. 4 gum, and 94% dichlorhydrin has been found to be particularly desirable. The product is tough, flexible, resilient, resistant to cold flow, insoluble in ordinary solvents and is acid and alkali resistant.

What is claimed is:

1. A plastic composition, comprising sulphur dichlorhydrin plastic, and a gum obtained from a tree in the family Sapotaceae of the genus Mimusops.

2. A plastic composition, comprising sulphur dichlorhydrin plastic, and a gum obtained from a tree in the family Sapotaceae of the genus Mimusops, the gum being at least 25% of the composition.

3. A plastic composition, comprising reaction products of alkaline polysulphides and olefin compounds containing the group $C_nH_{2n}$ combined with the equivalent of two monovalent negative radicals, and a gum obtained from a tree in the family Sapotaceae of the genus Mimusops.

4. A plastic composition, comprising reaction products of alkaline polysulphides and olefin compounds containing the group $C_nH_{2n}$ combined with the equivalent of two monovalent negative radicals, and a gum obtained from a tree in the family Sapotaceae of the genus Mimusops, the gum being at least 5% of the composition.

5. A plastic composition, comprising reaction products of alkaline polysulphides and olefin compounds containing the group $C_nH_{2n}$ combined with the equivalent of two monovalent negative radicals, ozokerite, and a gum obtained from a tree in the family Sapotaceae of the genus Mimusops.

6. A plastic composition, comprising reaction products of alkaline polysulphides and olefin compounds containing the group $C_nH_{2n}$ combined with the equivalent of two monovalent negative radicals, ozokerite, and a gum obtained from a tree in the family Sapotaceae of the genus Mimusops, the ozokerite being between about 1% and 5% of the composition.

7. A plastic composition, comprising reaction products of alkaline polysulphides and olefin compounds containing the group $C_nH_{2n}$ combined with the equivalent of two monovalent negative radicals, ozokerite, and a gum obtained from a tree in the family Sapotaceae of the genus Mimusops, the ozokerite being between about 1% and 5% of the composition and said reaction products of alkaline polysulphides and olefin compounds containing the group $C_nH_{2n}$ combined with the equivalent of two monovalent negative radicals and gum varying in proportion to each other from about one-twentieth to twenty times as much of one as of the other.

8. A plastic composition, comprising reaction products of alkaline polysulphides and olefin compounds containing the group $C_nH_{2n}$ combined with the equivalent of two monovalent negative radicals, sulphur dichlorhydrin plastic, and a gum obtained from a tree in the family Sapotaceae of the genus Mimusops.

CHESTER SNYDER.